J. B. F. HERRESHOFF.
PROCESS OF TREATING BURNER GASES.
APPLICATION FILED AUG. 10, 1906.
969,868.
Patented Sept. 13, 1910.
2 SHEETS—SHEET 1.
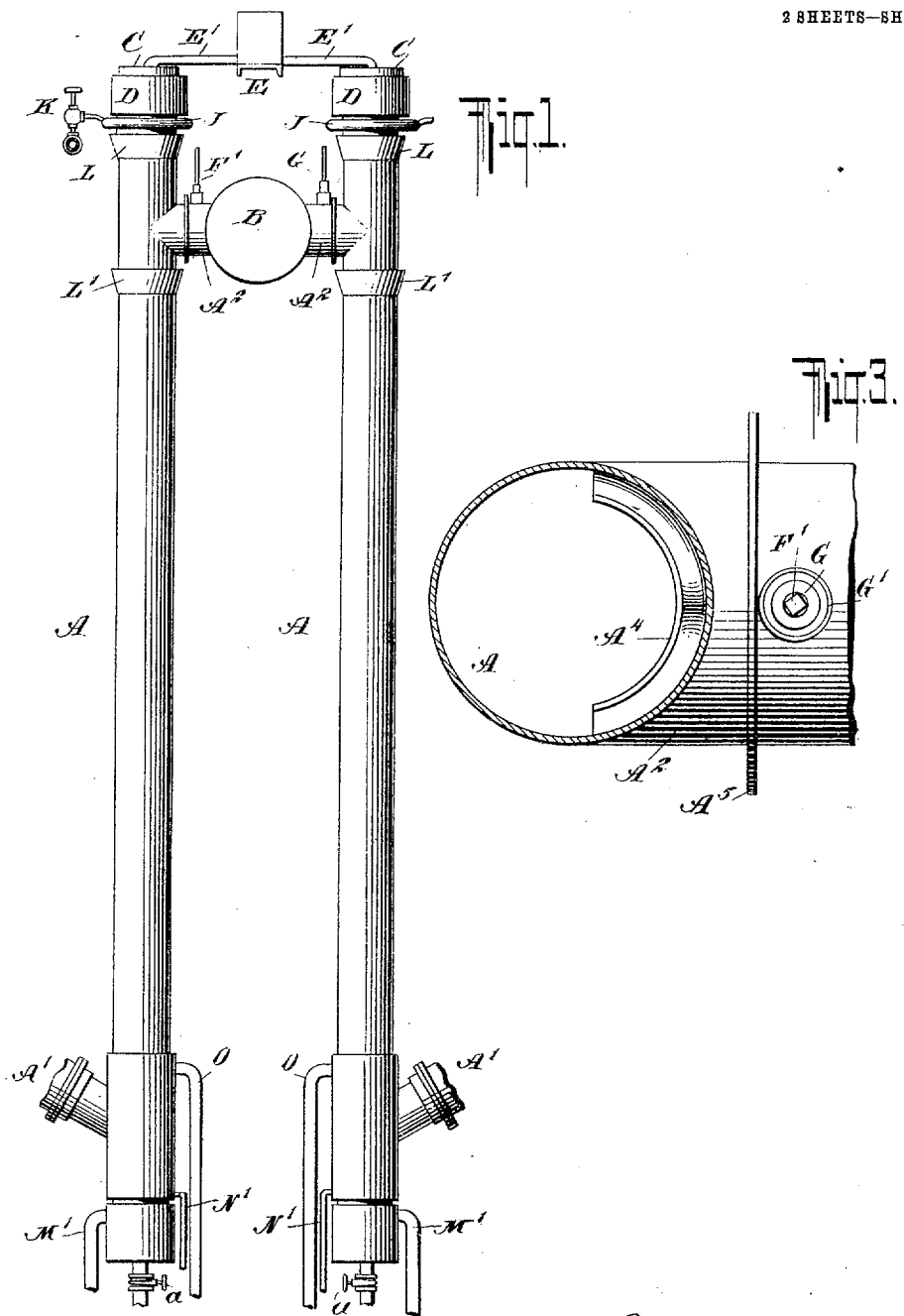

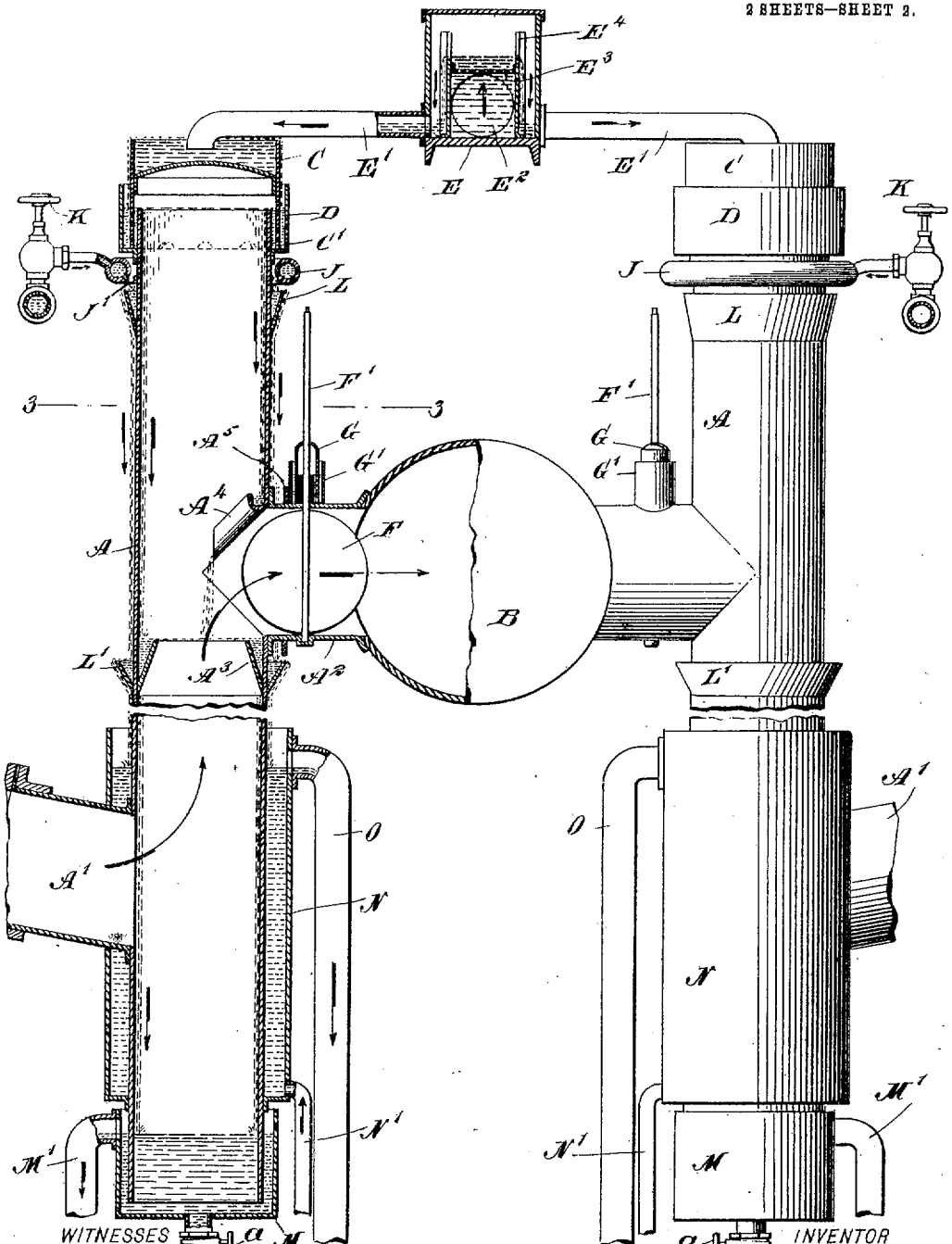

UNITED STATES PATENT OFFICE.

JOHN B. F. HERRESHOFF, OF NEW YORK, N. Y., ASSIGNOR TO GENERAL CHEMICAL COMPANY, OF NEW YORK, N. Y., A CORPORATION OF NEW YORK.

PROCESS OF TREATING BURNER-GASES.

969,868.  Specification of Letters Patent. Patented Sept. 13, 1910.

Application filed August 10, 1906. Serial No. 329,968.

*To all whom it may concern:*

Be it known that I, JOHN B. F. HERRESHOFF, a citizen of the United States, and a resident of the borough of Manhattan, city, county, and State of New York, have invented certain new and useful Improvements in Processes of Treating Burner-Gases, of which the following is a specification.

My invention relates to the treatment of burner gases for the purpose of preparing them for the manufacture of sulfuric acid.

The present invention relates to a preliminary treatment by cooling and also by removal from the gases of some of the objectionable constituents, before ultimate purification, and is used as a preliminary treatment to be followed by further purifying steps, and by a drying process such as treatment with strong sulfuric acid.

One great difficulty experienced with burner gases is their tendency to quickly destroy the metallic walls of the cooling conduits through which they pass. Whenever the temperature in such conduits is such that fractional condensation of strong sulfuric acid can take place, such acid at once attacks the iron, lead or analogous material which it reaches.

Having found that the difficulty arises from the foregoing causes I invented a process and means for overcoming it. In this connection I may state that neither mere external cooling of the conduit, nor the internal cooling of the gas by spraying or injection will answer for purposes of actual and continuous manufacture.

Broadly stated my invention consists in interposing a film of fluid between the body of the moving gases and the walls of the conduit, thereby protecting said walls if made of material attacked by the acids present, and at the same time condensing the sulfuric mists and removing from the gases floating or suspended particles.

An apparatus suitable for carrying out my present invention is shown in the accompanying drawings in which—

Figure 1 is a general outside view of such apparatus, Fig. 2 is an enlarged view of same with apparatus in sections, and Fig. 3 is a cross-section and plan on line 3—3 of Fig. 2.

The apparatus comprises a standpipe A or a series of such pipes, each provided at its lower part with an inlet connection A' through which the gas to be treated enters, and near the top with an outlet connection $A^2$ from which the treated gases pass to a header B, whence they are conducted to such other apparatus for purifying and other treatment as may be desired. Each stand-pipe A carries at its upper part a cap or sleeve C of slightly larger diameter, to permit of the formation of an annular space for overflow. This cap C is surrounded by a cylindrical wall D supported upon the stand-pipe, and small openings C' are made at or near the bottom of the cap C so that a liquid discharged into the space between the cylindrical wall D and the cap C may flow through the openings C', and rise in the annular space between the cap C and the upper end of the stand-pipe proper and overflow into said stand-pipe so as to form a continuous film in the inner surface thereof. This liquid, which is preferably weak sulfuric acid, is conveyed to the cup-shaped top of cap C from a supply tank E through a pipe E'. The said tank has an inlet pipe $E^2$ for the acid, a perforated partition $E^3$ through which the acid may rise, and imperforate vertical walls or weirs $E^4$ over the upper edges of which the acid may flow to reach the supply pipes E'.

Below the point where the outlet connection $A^2$ leaves the stand-pipe A, I locate within the pipe an inclined catch shield $A^3$, and above the opening leading to the outlet connection $A^2$, I arrange a sloping gutter $A^4$, from which so much of the liquid film flowing down on the inside of the stand-pipe as is caught by the gutter will be directed past the opening $A^2$ into the catch shield $A^3$ whence it resumes its flow along the under wall of the stand-pipe. In the outlet connection $A^2$ I may arrange a damper F, having an operating stem F', and preferably also provided with a hydraulic seal to prevent the escape of gases, said hydraulic seal comprising a closed bell-shaped portion G, which dips into a receptacle G', containing water or other liquid forming the seal.

To aid in cooling the pipe and its contents I have provided an annular tube J, connected with a suitable source of water (or other cooling medium) supply, as by a valve K, and having openings J' to discharge the water downwardly against the outer surface of the stand-pipe, and, if desired, into an annular trough L. The cooling water thus flows along the outside of the stand-pipe. At the point where the outlet $A^2$ branches off, a suitable guide rib $A^5$ is provided, so as to lead the water around the outlet connection $A^2$ into a trough L', from which the water again overflows along the outside of the stand-pipe.

The open lower end of the stand-pipe dips into a tank M containing a liquid, and having overflow M' so as to form a hydraulic seal. Around the lower portion of the stand-pipe is a jacket N, which not only receives at its upper end the water which has flowed down on the outside of the stand-pipe, but also has a water supply pipe N' at the bottom. Thus, in the said jacket water will flow upward to the outlet pipe O. The entire stand-pipe is thus cooled by a double flow of water, some passing up and some down as described.

In operation, as the gases pass through the stand pipe they will be cooled by the weak acid flowing down on the inside, and also by the action of the cooling liquid flowing on the outside of the stand-pipe. The inner film of fluid will prevent condensed acid from reaching and attacking the walls of the stand-pipe. Particles of impurities carried by the gases will be caught in said inner film and separated out of said gases carried to the tank or trough M, whence they may be conveniently removed, as, for instance, through pipe $a$. Any acid withdrawn at M', if desired, can be further cooled and purified and then returned to the supply tank E through the pipe $E^2$.

Instead of forming the film which flows within the stand-pipe of weak sulfuric acid the same may be formed of any other fluid adapted to the purpose.

I claim:

1. The process of treating burner gases, which consists in forming a continuous annular film or sheet containing sulfuric acid, and causing the gases to travel in the space surrounded by said film.

2. The process of treating burner gases, which consists in forming a continuous film or sheet containing sulfuric acid, causing the gases to travel in the space surrounded by the film, and cooling the film.

3. The process of treating burner gases, which consists in forming a continuous film or sheet containing sulfuric acid, causing the gases to travel in the space surrounded by said film, and passing a cooling medium around said film.

In testimony whereof, I have hereunto signed my name in the presence of two subscribing witnesses.

JOHN B. F. HERRESHOFF.

Witnesses:
WALLACE MURRAY,
HENRY WIGGLESWORTH.